(12) United States Patent
Stack et al.

(10) Patent No.: US 12,486,655 B2
(45) Date of Patent: *Dec. 2, 2025

(54) HIGH EFFICIENCY TOILET

(71) Applicant: Patrick Gerard Stack, Northville, MI (US)

(72) Inventors: Patrick Gerard Stack, Northville, MI (US); Joan Marie Stoneburner, Commerce Township, MI (US)

(73) Assignee: Patrick Gerard Stack, Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,051

(22) Filed: Mar. 21, 2024

(65) Prior Publication Data

US 2024/0401317 A1 Dec. 5, 2024

Related U.S. Application Data

(63) Continuation of application No. 18/507,832, filed on Nov. 13, 2023, now Pat. No. 11,987,967.

(60) Provisional application No. 63/506,244, filed on Jun. 5, 2023.

(51) Int. Cl.
*E03D 1/26* (2006.01)

(52) U.S. Cl.
CPC .................................. *E03D 1/263* (2013.01)

(58) Field of Classification Search
CPC ...................................................... E03D 1/263
USPC ............................................................ 4/300
See application file for complete search history.

(56) References Cited

U.S. PATENT DOCUMENTS

| | | | |
|---|---|---|---|
| 4,388,737 A | 6/1983 | Wenzel | |
| 5,548,850 A | 8/1996 | Geeham | |
| 6,173,456 B1 | 1/2001 | Nieto | |
| 6,502,251 B1 * | 1/2003 | Teshima | E03D 1/36 4/425 |

(Continued)

FOREIGN PATENT DOCUMENTS

| | | |
|---|---|---|
| DE | 3228441 A1 | 2/1984 |
| EP | 3009572 B1 | 8/2019 |

(Continued)

OTHER PUBLICATIONS

International Search Report for International Application No. PCT/US2024/031554, Issued Oct. 8, 2024.

*Primary Examiner* — Lori L Baker
(74) *Attorney, Agent, or Firm* — Howard & Howard Attorneys PLLC

(57) ABSTRACT

A high efficiency toilet configuration includes a water tank. The tank includes a supply line, a mechanical valve controlling a flow of water from the line into the tank, and walls and a base. The tank includes a through-hole in the base channeling water out of the water tank and a tank outlet hole including a housing extending through the through-hole. The tank includes an outlet valve configured for selectively prohibiting water from flowing through the tank outlet hole and permitting water through the tank outlet hole during a flush event. The tank includes a water column vessel disposed around the outlet hole and configured for separating water in the water tank between water outside of the vessel and a channel of water contained over the outlet hole. The configuration includes a toilet base including a bowl and a plenum for channeling the water to the bowl.

18 Claims, 15 Drawing Sheets

(56) References Cited

U.S. PATENT DOCUMENTS

| | | | |
|---|---|---|---|
| 7,757,708 B1 * | 7/2010 | Canfield | E03D 11/00 137/460 |
| 8,166,996 B2 * | 5/2012 | Canfield | E03D 11/00 137/460 |
| 8,310,369 B1 * | 11/2012 | Canfield | G08B 5/36 4/314 |
| 8,362,907 B1 * | 1/2013 | Canfield | G08B 3/10 340/605 |
| 8,704,671 B2 * | 4/2014 | Canfield | G08B 3/10 4/427 |
| 9,671,278 B2 * | 6/2017 | Jin | G01H 11/08 |
| 9,725,893 B2 * | 8/2017 | Cain | E03D 1/33 |
| 9,745,730 B2 | 8/2017 | Chang | |
| 10,066,754 B2 * | 9/2018 | Ghalambor | E03D 1/00 |
| 10,385,559 B2 * | 8/2019 | Canfield | E03D 5/026 |
| 10,597,856 B2 * | 3/2020 | Guthrie | F16K 31/06 |
| 10,962,402 B1 * | 3/2021 | Halimi | G01M 3/40 |
| 10,995,481 B2 * | 5/2021 | Veros | E03D 5/026 |
| 11,091,903 B2 * | 8/2021 | Grover | G01F 23/2962 |
| 11,365,827 B2 * | 6/2022 | Hainzer | F16K 31/265 |
| 11,589,718 B2 * | 2/2023 | Pegden | A47K 13/26 |
| 11,987,967 B1 | 5/2024 | Stack et al. | |
| 2004/0139788 A1 * | 7/2004 | Ghertner | E03D 1/00 73/40 |
| 2008/0066220 A1 * | 3/2008 | Shaul | E03D 9/05 4/216 |
| 2018/0135285 A1 * | 5/2018 | Canfield | E03D 5/105 |
| 2021/0254323 A1 * | 8/2021 | Grover | E03D 5/105 |

FOREIGN PATENT DOCUMENTS

| | | |
|---|---|---|
| JP | S60144669 U | 9/1985 |
| JP | 2002021144 A | 1/2002 |
| KR | 890016382 U | 8/1989 |
| WO | 201085056 A2 | 7/2010 |

* cited by examiner

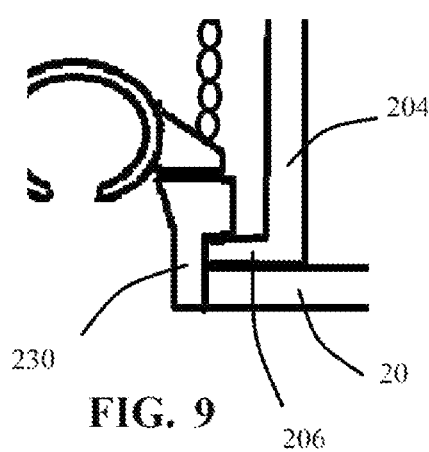 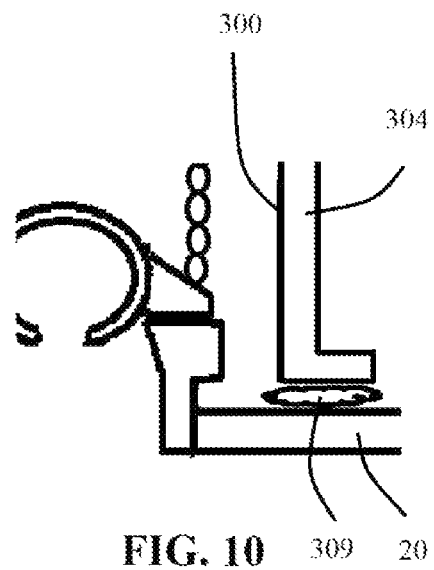

HIGH EFFICIENCY TOILET

CROSS-REFERENCE TO RELATED APPLICATIONS

The subject patent application is a Continuation of U.S. patent application Ser. No. 18/507,832, filed on Nov. 13, 2023, which claims priority to, and all the benefits of, U.S. Provisional Patent Application No. 63/506,244, filed on Jun. 5, 2023, the entire contents of which are incorporated by reference herein.

TECHNICAL FIELD

This disclosure relates to an improved bathroom fixture for flushing bodily waste materials into a drainage or sewer system. More particularly, this disclosure includes a toilet having structures within the water tank useful to provide excellent flushing power with a minimal amount of water.

BACKGROUND

A traditional bathroom fixture may include a water tank that empties in order to create a flush event in the toilet bowl of the fixture. The water tank includes an internal volume which is filled with water. A fill valve may include a first floating member which is attached to a mechanical valve. The fill valve may control a flow of water flowing into the water tank from a water supply line. When the water level within the tank reaches a desired water level within the tank, the first floating member floating upon a surface of the water may provide an actuation force upon the mechanical valve, which may close off water flowing into the tank. Upon a subsequent flush event, the water level in the tank goes down, the first floating member goes down with the water level, and the mechanical valve is reopened to permit water to flow into the tank from the water supply line.

A flush event may utilize all or most of the water within the water tank. For example, a flapper valve may include a second floating member. The flapper valve may be pivotingly attached near a tank outlet hole. The second floating member is buoyant within water, such that the flapper valve including the second floating member is biased in an up position, which permits water within the water tank to flow out of the tank outlet hole. When the tank is emptied by the flush event, the flapper valve may settle sealingly upon a tank outlet hole, as directed by a hinge pivotingly attaching the flapper valve to an edge of the water outlet hole. As water within the tank is refilled, water pressure acting upon a top side of the flapper valve overcomes the buoyancy of the flapper valve and retains the flapper valve in its sealing position over the tank outlet hole. When a user depresses a flush button or lever, a chain or other mechanism overcomes the water pressure holding the flapper valve in position over the tank outlet hole. Upon the seal between the flapper valve and the tank outlet hole being broken, pressure is equalized about the flapper valve, and the buoyancy of the flapper valve may act to again bias the flapper valve in an angled-up orientation away from the tank outlet hole. Water within the tank is then free to flow through the tank outlet hole, flow through internal passages of the fixture, and provide water to the toilet bowl to effectuate the flush event.

Water efficiency is a priority to the consuming public. Some areas experience water shortages. Providing a supply of water consumes energy. Benefits may be achieved by reducing a volume of water consumed in every flush event. One way in which toilets may consume less water is to lower a water level at which the mechanical valve turns off the flow of water into the tank. For example, where a traditional fixture may fill the water tank with six inches of water, an efficient fixture may be limited to filling the water tank to three inches.

Water pressure or head pressure at a point within the water tank is proportional to a depth of the water at that point. For example, if the tank outlet hole is six inches under the water level, the head pressure at the tank outlet hole is twice the head pressure in a similar tank where the outlet hole is three inches under the water level.

High efficiency toilets that conserve water by only filling the water tank to a relatively low level suffer from low head pressure in the water exiting the water tank and being utilized to power the flush event. As a result, the flush event may be relatively weak, with water and waste being less likely to effectively evacuate water and waste matter from the toilet bowl or to barely deliver the water and waste matter into connecting sewer pipes, which may cause problems in the sewer pipes.

SUMMARY

A high efficiency toilet configuration is provided. The toilet configuration includes a water tank. The water tank includes a water supply line, a mechanical valve controlling a flow of water from the water supply line into the water tank, and side walls and a tank base defining an internal volume of the water tank. The water tank further includes a first through-hole in the tank base configured for channeling water out of the water tank and a tank outlet hole including a housing extending through the first through-hole in the tank base. The water tank further includes a tank outlet valve configured for selectively prohibiting water in the water tank from flowing through the tank outlet hole and permitting water to flow through the tank outlet hole during a flush event. The water tank further includes a water column vessel disposed around the tank outlet hole and configured for separating water in the water tank between water outside of the water column vessel and a channel of water contained over the tank outlet hole. The toilet configuration further includes a toilet base including a bowl including a waste receiving basin and a water supply plenum operable to receive water from the water storage tank and channel the water to the bowl.

In some embodiments, the water column vessel includes a second through-hole configured for permitting the water outside of the water column vessel to refill the channel of water.

In some embodiments, walls of the water column vessel are formed unitarily with walls of the water tank.

In some embodiments, the water column vessel is a separate component which attaches to one of the tank outlet valve or walls of the water tank.

In some embodiments, a base portion of the water column vessel secures against features of the tank outlet valve.

In some embodiments, walls of the water column vessel are affixed to walls of the water tank.

In some embodiments, the water tank further includes a bypass tube configured for enabling water to refill the waste receiving basin after the flush event and the bypass tube is contained within the water column vessel.

In some embodiments, the water tank further includes a bypass tube configured for enabling water to refill the waste receiving basin after the flush event. The bypass tube is formed unitarily with the water column vessel.

In some embodiments, the tank outlet valve is formed unitarily with the water column vessel.

In some embodiments, the water column vessel is relatively wider at a top portion and relatively narrower at a bottom portion.

In some embodiments, the water column vessel is configured for segmenting water within the water column vessel from water outside of the water column vessel, such that particulate matter or debris within the water outside of the water column vessel is prevented from contaminating the water outlet valve.

In some embodiments, the mechanical valve includes a float mechanism controlling activation and deactivation of the mechanical valve, and the float mechanism is disposed within the water column vessel.

In some embodiments, the tank outlet valve includes a flapper valve.

In some embodiments, the tank outlet valve includes a polymerized flapper valve and a weight attached to the polymerized flapper valve.

In some embodiments, the water tank is configured for a water level prior to the flush event being higher than an upper edge of the water column vessel. The tank outlet valve may be configured for adjustable closure.

In some embodiments, the tank outlet valve is configured for adjustable closure.

According to one alternative embodiment, a retrofit kit for a toilet fixture is provided. The retrofit kit includes a water column vessel configured to be attached to one of a tank outlet valve of the toilet fixture or an internal wall surface of a water tank of the toilet fixture. The water column vessel is configured for separating water in the water tank between water outside of the water column vessel and a channel of water contained over the tank outlet hole. The water column vessel includes a through-hole configured for permitting the water outside of the water column vessel to refill the channel of water.

In some embodiments, the retrofit kit further includes adhesive configured to affix the water column vessel in place within the water tank.

In some embodiments, the water column vessel includes a tank outlet valve integrally formed with the water column vessel and a bypass tube integrally formed with the water column vessel and configured for enabling water to bypass the tank outlet valve.

BRIEF DESCRIPTION OF THE DRAWINGS

One or more embodiments will now be described, by way of example, with reference to the accompanying drawings, in which:

FIG. 5 schematically illustrates the water column vessel of FIG. 3 in side cross-sectional view, illustrating the water column vessel in a full state, in accordance with the present disclosure;

FIG. 6 schematically illustrates the water column vessel of FIG. 3 in side cross-sectional view, illustrating the water column vessel after initiation of a flush event, in accordance with the present disclosure;

FIG. 7 schematically illustrates the water column vessel of FIG. 3 in side cross-sectional view, illustrating the water column vessel in an empty state and with the tank outlet valve resetting to a sealed state, in accordance with the present disclosure;

FIG. 8 schematically illustrates the water column vessel of FIG. 3 in side cross-sectional view, illustrating the water column vessel being filled in preparation for a subsequent flush event, in accordance with the present disclosure;

FIG. 9 schematically illustrates in front sectional view a first embodiment of the water column vessel of FIG. 3, wherein the walls of the water column vessel sealingly attach to features of the tank outlet valve, in accordance with the present disclosure;

FIG. 10 schematically illustrates in front sectional view a second embodiment of the water column vessel of FIG. 3, wherein the walls of the water column vessel are affixed to a wall of the water tank with adhesive or a similar material, in accordance with the present disclosure;

DETAILED DESCRIPTION

Figure 1:
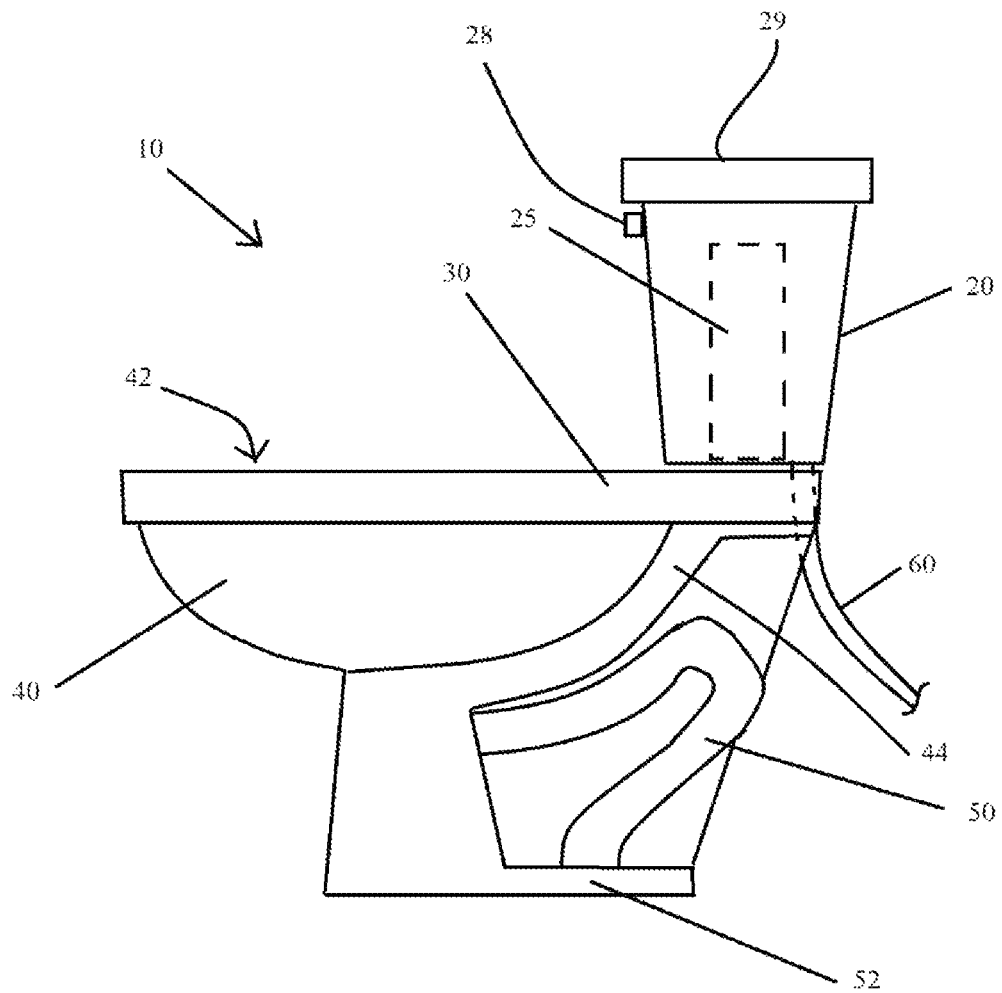
FIG. 1 schematically illustrates in side view an exemplary toilet fixture including a water tank, a toilet base, and a water supply line, in accordance with the present disclosure.

A high efficiency toilet fixture is provided including structures within a water tank of the toilet fixture configured for providing excellent head pressure at a tank outlet hole. The high efficiency toilet may operate a flush event, consuming a relatively small volume of water. In one embodiment, the flush event may consume 1.28 gallons/4.8 liters per flush. In another embodiment, the flush event may consume 0.8 gallons/3.0 liters per flush.

The structures within the water tank encapsulate a portion of the water within the water tank above the tank outlet hole. This portion of water may include a column of water occupying a portion of the volume inside of the water tank and isolated or partially isolated from a remainder of the volume of the water tank. The depth of the column of water encapsulated above the tank outlet hole, when the tank is in a filled condition between flush events, is maximized or maintained above a threshold minimum water column depth as compared to the position of the tank outlet hole and the water level of the column of water. Head pressure at a point within the water tank is directly proportional to a water depth at the point. By maintaining a threshold minimum water column depth above the tank outlet hole prior to or at the initiation of a flush event, a corresponding minimum head pressure available or acting upon the water exiting the water tank at the initiation of the flush event may be maintained.

A variety of flapper valve configurations and alternatives to flapper valves are utilized in the industry. A canister valve may similarly include a second floating member embodied as a cylindrical canister. The canister may be configured for transiting upward some small distance (an inch, for example) on a central rod. A bottom surface of the canister may include a ring shaped or annular rubberized seal configured to seal against the tank outlet hole. Buoyancy of the second floating member within the canister and gravity may alternatively work to permit a flush event and permit the water tank to seal with water, with the hinge of the flapper valve being replaced with the canister moving along the central rod. Other similar mechanisms are utilized to selectively permit and prohibit water flow through the tank outlet hole and may collectively, including the flapper valve and the canister valve, be described as a tank outlet valve. The tank outlet valve may include a fitting that extends within a hole in the bottom of the water tank (formed in exemplary ceramic material of the tank), and features of the tank outlet valve may define the tank outlet hole, for example, with a circular cavity being formed in a plastic collar that extends into the hole in the bottom of the water tank. The flapper or canister of the tank outlet valve may seal against this circular cavity of the tank outlet valve to create the seal which permits selective filling of the water tank. The tank outlet valve may further include a bypass tube which extends from the area of the tank outlet hole upwardly over a surface of the water when the water tank is in a filled state. A flexible water supply tube may connect with the bypass tube and provide a flow of water thereto whenever the water tank is being filled. Water flowing into the bypass tube bypasses the tank outlet valve and is utilized to partially fill the toilet bowl between flushes.

A column of water may be created over the tank outlet hole and the tank outlet valve. This column of water, when the water tank is in a fully filled state or condition, may provide head pressure at the tank outlet hole to enable initiation of a flush event. The column of water may include a limited volume of water. The volume of water available for a flush event, if the column of water is fully depleted during the flush event, may be defined as the depth of the column of water at the tank outlet hole at the initiation of the flush event times an average cross-sectional area of the column of water defined in horizontal cross-sectional planes minus a volume occupied by other features such as a flapper valve/canister valve and the bypass tube.

Dimensions, volume, and shape of the column of water encapsulated over the tank outlet hole may be controlled or defined by an internal volume of a water column vessel disposed within the water tank. The water column vessel may be connected to or formed integrally with the tank outlet valve. Features of the tank outlet valve such as the flapper valve/canister valve and the bypass tube may be disposed or incorporated inside of the water column vessel. The water column vessel separates or distinguishes water outside of the water column vessel from the column of water contained or encapsulated within the water column vessel. As a flush event occurs, water empties from the water column vessel and flows out of the water tank through the tank outlet hole.

During and/or upon completion of the flush event, the tank outlet valve seals, the mechanical valve controlling the water supply to the water tank opens, and water is supplied to the water column vessel. In one embodiment, one or more holes may be formed in a wall of the water column vessel, enabling water from outside of the water column vessel to flow into the water column vessel. Location and geometry of the hole or holes in the wall of the water column vessel may be utilized to control the properties of the refilling of the water column vessel. For example, if the hole(s) permit a relatively large flow of water to quickly enter the water column vessel, a time to initiate a second or subsequent flush event may be lessened. However, if a relatively small flow of water is permitted to refill the water column vessel, water may be conserved, for example, by preventing the user from holding the flush handle down to create more flushing action. Vertical location of the hole(s) may similarly be utilized to control parameters of the refilling of the water column vessel. So long as water outside of the water column vessel is above the hole, water will flow into and fill the water column vessel. For example, holes located near a bottom of the water column vessel may permit rapid filling of the water column vessel. However, if the user holds down the flush lever, water will continue to flow through these holes near the bottom of the water column vessel until the water level of the water outside of the water column vessel is lowered to the level of the holes. Such a configuration enables the user to control how much water is consumed in a flush event. If the hole(s) are near a top of the water column vessel or a little below the water line of the water tank when the tank is in a fully filled state, the water level of water outside of the water column vessel will rapidly lower to the level of the hole(s), thereby preventing the user from consuming the relatively larger volume of water remaining outside of the water column vessel.

Geometry of the walls of the water column vessel may vary. For example, a total volume of the water consumed by the flush event may be controlled by selecting a total volume inside of the water column vessel. A cross-sectional area of the water column vessel may be impacted by the geometry of the features contained within the water column vessel, for example by a geometry of the flapper valve/canister valve and of the bypass tube. The walls of the water column vessel surround the features contained within the water column vessel and provide enough space for the features to operate as intended, for example, permitting the flapper valve/canister valve to move between states of the valve and permitting water to flow around the valve into the tank outlet hole at an acceptable rate. The walls of the water column vessel, when viewed from above, may include a square, rectangular, circular, oval, conical, or triangular shape, or may include any geometric or irregular shape. A top of the walls of the water column vessel may include a cut-out portion. A flushing knob that extends outside of the tank may include a chain arm inside the tank that extends over the water column vessel. The walls of the water column vessel near the top of the tank may be shaped or scalloped to enable the movement of the flushing knob chain arm above the water column vessel.

The water column vessel may include a variety of cross-sectional shapes. The water column vessel may be cylindrical, with a round cross-sectional shape with vertical or nearly vertical side walls. The water column vessel may be an oval cylinder or elliptical cylinder, with an oval or elliptical cross-sectional shape and with vertical or nearly vertical side walls. The water column vessel may include a polygonal cross-sectional shape, with a triangular, square, rectangular, pentagonal, or other similar shape. The water column vessel may include an irregular shape, for example, defined by surrounding and following the contours of the features within the water column vessel. The water column vessel may be constructed as part of the water tank with a ceramic material. The water column vessel may be constructed with a water stable material useful for separating water within the water tank and may be constructed with a polymer, such as polypropylene, metal, such as aluminum, or other similar materials.

Geometry of the side walls of the water column vessel may be configured for providing excellent head pressure at the tank outlet hole. For example, the side walls of the water column vessel may angle outwards away from the tank outlet hole, providing for larger cross-sectional area of the water column vessel at the top of the water column vessel. Similarly, the side walls may move outwardly in a step or immediate increase as the walls project upwardly from the tank outlet hole. This expanded top of the water column vessel makes more water available to a flush event at greater depth during the flush event. An average depth of the water at the tank outlet hole during the flush event may be increased by increasing a volume of the water at the top of the column of water, thereby providing a larger or greater head pressure through more of the flush event.

As water flows from outside of the water column vessel into the water column vessel, the water level of the water outside of the water column vessel will lower. This lowering water level outside of the water column vessel will control a float level of the first floating member and the subsequent opening and closing of the mechanical valve controlling water flow into the water tank from the water supply line.

The disclosed water column vessel may be provided as an aftermarket or retrofit device for installation to an existing toilet fixture. In an event that the water column vessel is formed unitarily with or as part of a designed unitary device with the tank outlet valve, the bypass tube may be formed integrally with the water column vessel. This integral formation may enable a cross-sectional area of the water column vessel smaller at the base of the water column vessel or where the water column vessel attaches to the tank outlet hole. This smaller cross-sectional area enabled by integrating the bypass tube into the water column vessel may enable smaller flush volumes defined by a smaller internal volume of the water column vessel, greater sidewall angles enabling a higher average depth at the tank outlet hole during flush events, and/or more of the internal space of the water column vessel being devoted to providing open water flow to the tank outlet hole during the flush events.

The disclosed water column vessel seals or affixes to elements of the water tank at or near a bottom of the water tank. The water column vessel may allow water to enter the water column vessel along a side of the water column vessel some distance up the walls of the water column vessel. In some geographic areas, water provided through infrastructure plumbing to fill the water tank may include particulate matter or debris. This particulate matter/debris may interfere with a flapper valve or similar device making a proper seal at the water tank outlet. As a result, water may be wasted, flowing past the flapper valve or similar device when no flush is intended. Particulate matter and debris tend to be denser than water. As a result, such particulate matter and debris tend to settle at the bottom of the water tank. By not permitting water to enter the water the water column vessel at a bottom of the water column vessel, the water column vessel prevents much of the particulate matter and debris from reaching the flapper valve, thereby preventing the particulate matter and debris from negatively affecting the sealing ability of the flapper valve.

FIG. 1 schematically illustrates in side view an exemplary toilet fixture 10 including a water tank 20, a toilet base 30, and a water supply line 60. The toilet base 30 is illustrated including a toilet bowl 40 including a waste receiving basin 42. The toilet base 30 is further illustrated including a water supply plenum 44 configured for receiving a flow of water from the water tank 20 and distributing the water to holes around a rim of the waste receiving basin 42 and a jet outlet in a bottom of the waste receiving basin 42. The toilet base 30 further includes a trap way 50 configured for creating a siphon-enabled flush event, emptying water and waste from the waste receiving basin 42 when a sudden supply of water is provided from the water tank 20 to the waste receiving basin 42. The trap way 50 empties from the toilet base 30 from a toilet base outlet 52 which is connected to sewer pipes of the structure to which the toilet fixture 10 is installed.

The water tank 20 includes a reservoir of water which, upon depression of a flush knob 28, creates the flush event wherein a sudden flow of water results from emptying the water tank 20 or a portion of the water tank 20 into the water supply plenum 44 of the toilet base 30. The tank 20 is illustrated including a lid 29. The water tank 20 includes an internal mechanical valve that receives a flow of water from the water supply line 60. The mechanical valve is normally closed when the water tank 20 is at a full level. When the water level within the water tank 20 goes below a full level, a float attached to the mechanical valve goes down, which activates the mechanical valve to permit water to flow into the water tank 20 from the water supply line 60.

Water conservation may be an important goal and may be a requirement for toilet fixtures 10. Some purchasers and some governments require that toilet fixtures 10 conform to volume per flush requirements. There may also be requirements that the toilet fixture 10 flush with a certain minimum amount of force. For example, one test for toilet fixtures 10 includes a measurement of how far water is flushed from the toilet base outlet 52. The toilet fixture 10 provides excellent water conservation and excellent toilet performance by limiting a supply of water available within the water tank 20 that may be flushed in a flush event and by maximizing a head pressure at which the water is supplied from the water tank 20. A portion of the interior of the water tank 20 may be described as a water column 25. By limiting a volume of water that is available for a flush event, water conservation goals may be achieved by making only the volume of water in the water column 25 available to flush. Head pressure, or the pressure of the water at a particular point in the tank, is created or is a factor of a depth of the water at that point. By forming the water column 25 into a thin and tall column of water, the pressure created by the water within the water column 25 at a bottom of the water column 25 may be maximized.

Figure 2:
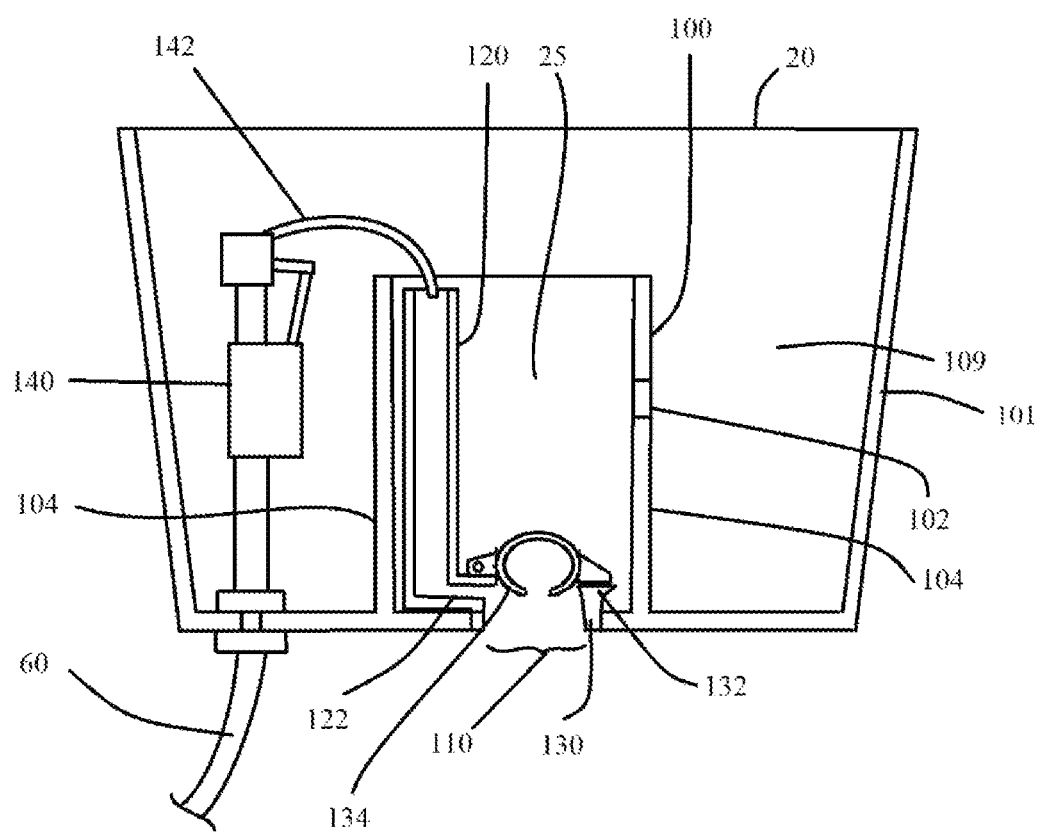
FIG. 2 schematically illustrates in front sectional view the water tank of FIG. 1, including a tank outlet hole, a tank outlet valve, and a water column vessel configured for creating a column of water over the tank outlet hole, wherein the water column vessel is formed unitarily with the material of the water tank walls, in accordance with the present disclosure.

FIG. 2 schematically illustrates in front sectional view the water tank 20 of FIG. 1, including a tank outlet hole 110, a tank outlet valve 130, and a water column vessel 100 configured for creating a column of water 25 over the tank outlet hole 110, wherein the water column vessel 100 is formed unitarily with the material of the water tank walls 101. The water tank 20 is illustrated further including a mechanical valve 140 configured for selectively permitting and restricting a flow of water from the water supply line 60. When the mechanical valve 140 permits water to flow into the water tank 20, water is additionally directed through bypass water line 142. The bypass water line 142 directs a small flow of water through a bypass tube 120 which is connected to or formed unitarily with the tank outlet valve 130, such that the water provided by the bypass water line 142 flows through a bypass aperture 122 and into the waste receiving basin 42 of the toilet fixture 10 of FIG. 1, refilling the waste receiving basin 42 after a flush event is executed.

The water column vessel 100 segments or divides water within the water tank 20 into the water column 25 which is available for a flush event and water outside the water column 109. The water column vessel 100 includes walls 104 which contain the water column 25. One or more apertures 102 in the walls 104 permit water to flow from the water outside of the water column 109 into the water column 25. The aperture 102 may be any shape. In the embodiment of FIG. 2, the aperture 102 is a rectangular opening in the wall 104. When the water tank 20 is full, the water outside of the water column 109 and the water column 25 may each be at a full level. In one embodiment, the water outside of the water column 109 and the water column 25 may be a same water level when both are at a full level. In another embodiment, the apertures 102 may include pressure activated valves which permit flow of water into the water column 25 only when the head pressure on the water outside of the water column 109 side of the aperture 102 is greater than the pressure on the water column 25 side of the aperture 102 by more than a selected amount. Upon initiation of a flush event, the flapper valve 134 is opened, the water column 25 empties through the tank outlet hole 110, the flapper valve 134 resets against a sealing surface 132, and water from the water outside of the water column 109 flows into the water column 25 to refill the water column 25. Meanwhile, as the water level of the water outside of the water column 109 goes down, the mechanical valve 140 activates to permit water to flow from the water supply line 60 to refill the water outside of the water column 109.

The water tank 20 of FIG. 2 is constructed with the walls 104 of the water column vessel 100 formed integrally therewith. If one were to retrofit an existing toilet water tank with the water tank 20, one could provide the disclosed water column 25 and the benefits thereof by replacing the existing toilet water tank.

Figure 3:
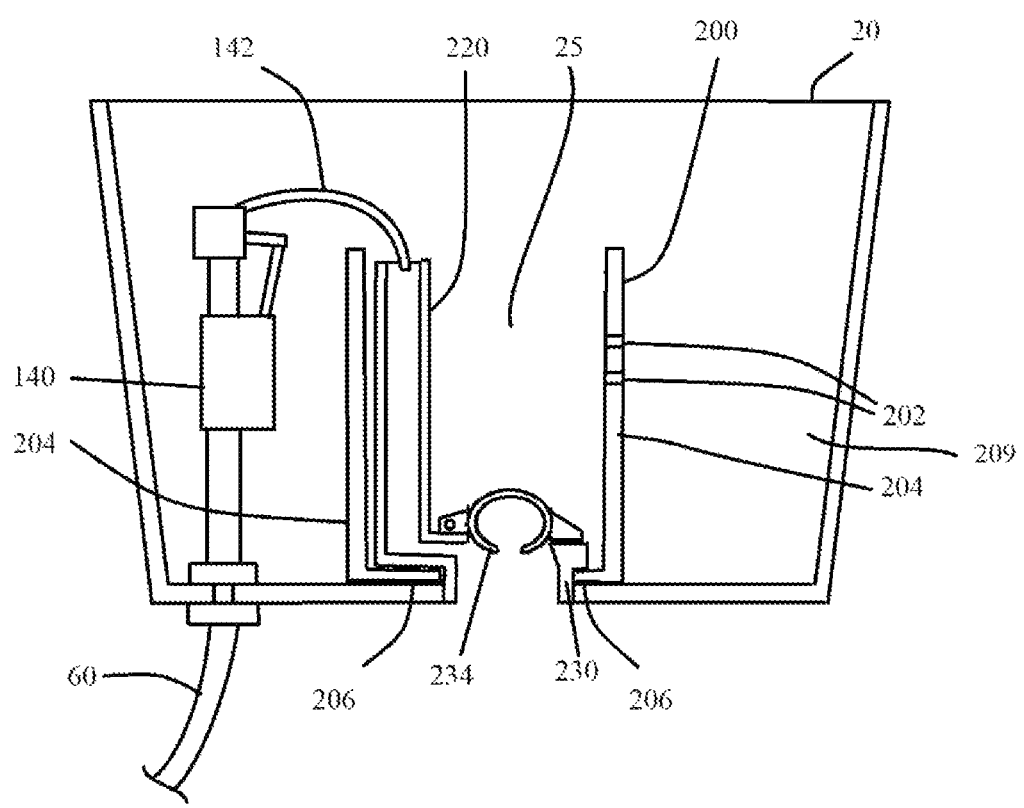
FIG. 3 schematically illustrates in front sectional view an alternative water tank, wherein a water column vessel is provided as separate component within the water tank, in accordance with the present disclosure.

FIG. 3 schematically illustrates in front sectional view an alternative water tank 20, wherein a water column vessel 200 is provided as a separate component within the water tank 20. Replacing an entire existing toilet water tank may be cost prohibitive. The water column vessel 200 may be provided as a retrofit kit for an existing toilet water tank, converting the existing toilet water tank into the water tank 20 including the water column 25. The exemplary water column vessel 200 may be placed within the water tank 20 and may seal against either the bottom of the water tank 20 or against a tank outlet valve 230, such that water within the water column 25 is separated from the water outside of the water column 209. The water column vessel 200 is illustrated including walls 204 and a base portion 206 configured for sealing against one of the tank outlet valve 230 or the walls of the water tank 20. Holes 202 in the walls 204 enable water to flow from the water outside of the water column 209 into the water column 25. The mechanical valve 140 is illustrated enabling water to selectively flow from the water supply line 60 into the water tank 20 to replenish the water outside of the water column 209. The bypass water line 142 is illustrated configured for providing a flow of water into a bypass tube 220 contained within the water column vessel 200. A flapper valve 234 is illustrated at a base of the water column 25.

The flapper valve 234 utilized in the art may include an entirely polymerized flapper, with an exemplary rubber material used in the construction of the flapper valve 234. Such an entirely polymerized flapper, once a flush lever is depressed, floats upwardly away from the tank outlet valve 230 until the water in the column lowers enough for gravity to cause the flapper valve 234 to seal against the tank outlet valve. However, such an entirely polymerized flapper valve 234 may require the water column vessel 200 to entirely empty or almost entirely empty before the flapper valve 234 seals. A metallic or dense weight may be added to the flapper valve 234 to encourage the flapper valve 234 to seal more quickly, thereby enabling better control over small volume flush events. The weight of the flapper valve 234 must be balanced against the buoyancy of the flapper valve 234, such that the flapper valve 234 still floats upward when the flush lever is depressed while still being weighted enough to quickly seal when after a desirably small volume of water has been flushed through the tank outlet valve 230. The weight may be metal, stone, dense polymer, or other similar material.

Figure 4:
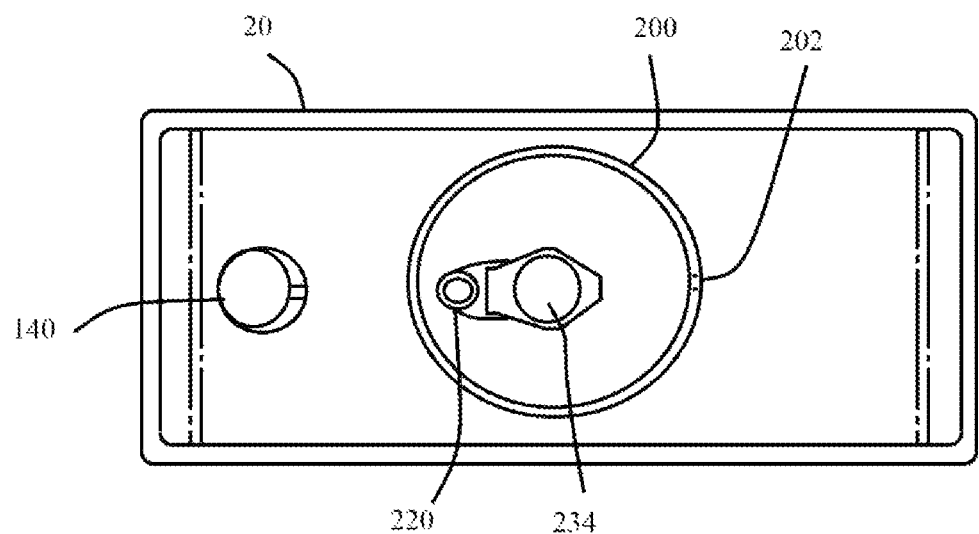
FIG. 4 schematically illustrates the water tank of FIG. 3 in a top view, in accordance with the present disclosure.

FIG. 4 schematically illustrates the water tank 20 of FIG. 3 in a top view. The water tank 20 is illustrated including the water column vessel 200, the mechanical valve 140, the bypass tube 220, and the flapper valve 234. The water column vessel 200 is illustrated including a hole 202. The water column vessel 200 is a circle when viewed from above. Other shapes may include an oval, a rectangle, or other similar shapes.

The location and shape of the hole 202 may be fixed with the water column vessel 200 provided to the consumer with the hole pre-drilled or pre-formed. In another embodiment, the water column vessel 200 may be provided to the consumer with indentations or markings suggesting where holes 202 may be drilled by the consumer. Printed instructions delivered with the water column vessel 200 may describe operation of the toilet fixture 10 depending upon where the holes 202 are formed, how many holes 202 are formed, the size of the holes 202, etc.

Figure 5:
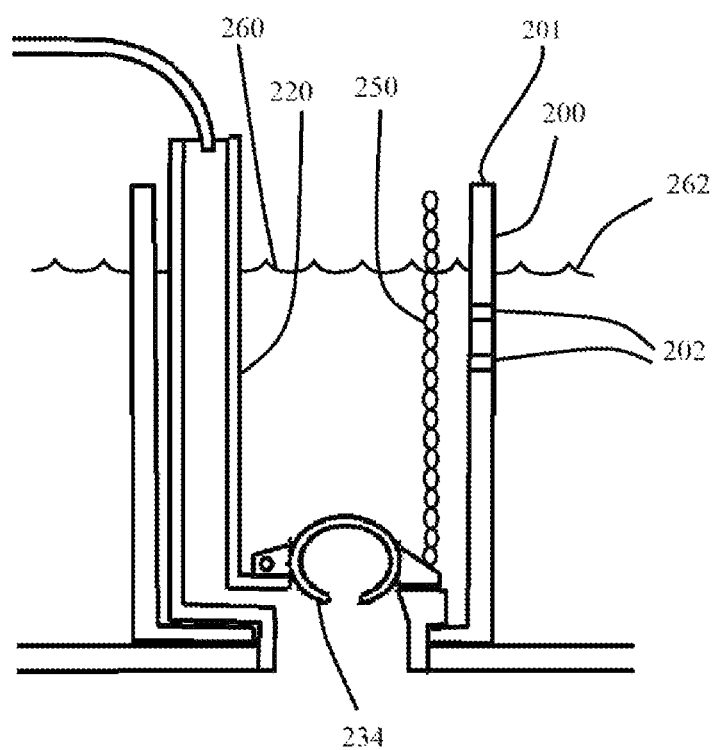
FIGS. 5-8 illustrate in front sectional view the water column vessel of FIG. 3 in various states through a flushing and filling cycle, in accordance with the present disclosure.

FIGS. 5-8 illustrate the water column vessel 200 of FIG. 3 in various states through a flushing and filling cycle. FIG. 5 schematically illustrates the water column vessel 200 of FIG. 3 in side cross-sectional view, illustrating the water column vessel 200 in a full state. The water column vessel 200 is illustrated including the holes 202 and an upper edge 201 of the walls of the water column vessel 200. The bypass tube 220 is illustrated without any water flowing through the bypass tube 220. The flapper valve 234 is illustrated in a sealed state, such that the water within the water column vessel 200 is contained and does not flow out of the water tank 20. A water level 260 inside the water column vessel 200 and a water level 262 outside of the water column vessel 200 are at a same level or are in equilibrium with each other. A flush chain 250 is illustrated connected to the flapper valve 234.

Figure 6:
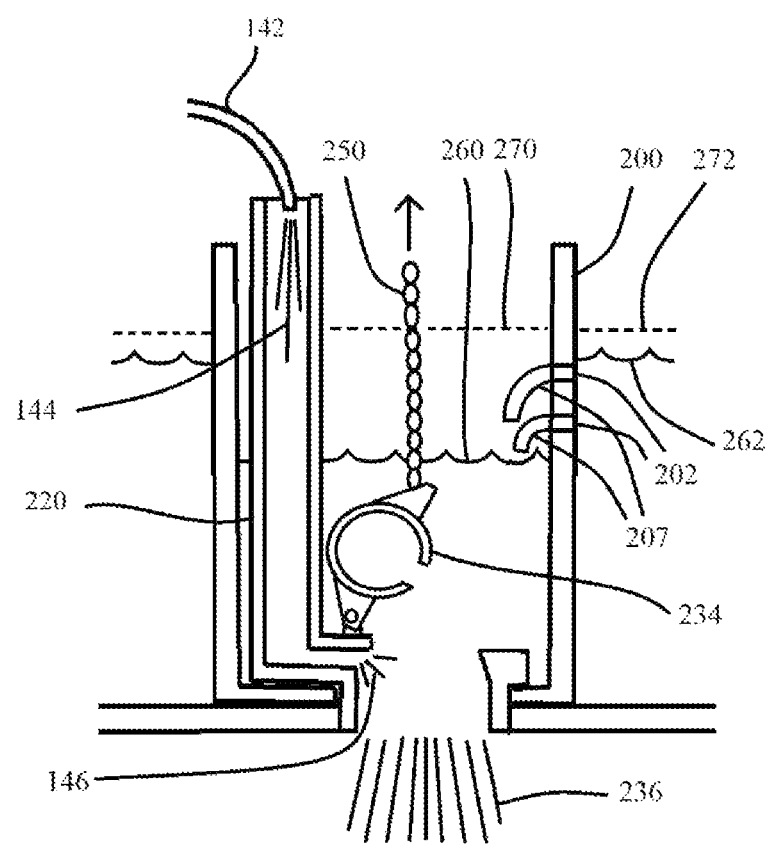

FIG. 6 schematically illustrates the water column vessel 200 of FIG. 3 in side cross-sectional view, illustrating the water column vessel 200 after initiation of a flush event. A flush knob and an attached flush knob chain arm have been activated, and an upward force has been generated on the flush chain 250, such that the flapper valve 234 has been dislodged from its previous sealed state. The flapper valve 234, once dislodged, floats or is buoyant in the water within the water column vessel 200 until the water column vessel 200 empties. Water may now flow from the water column vessel 200 as a flushing flow 236. The water level 260 within the water column vessel 200 drops quickly as the water exits the water column vessel 200. The water level 262 outside the water column vessel 200 drops more slowly as flows of water 207 flow through the holes 202. A full water level 270 and a full water level 272 are illustrated, each showing how far the water level 260 and the water level 262, respectively, have fallen since the initiation of the flush event.

As the water level 262 falls, the mechanical valve 140 of FIG. 3 will activate. Water flow 144 will be created in the bypass tube 220, resulting in an additional flow of water 146 during the flush event.

Figure 7:
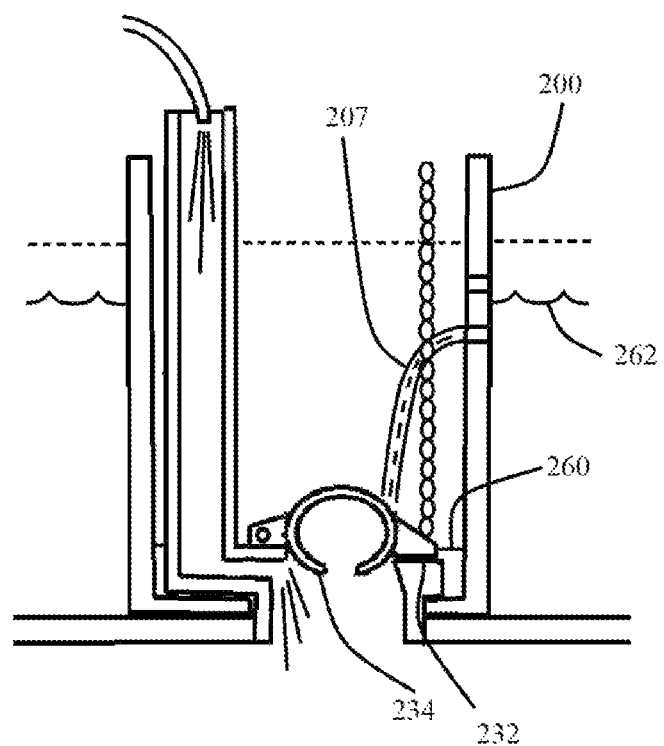

A total volume of the flush event may be defined as a volume of water initially within the water column vessel 200 before the initiation of the flush event plus the volume of water that the flows of water 207 provide to the water column vessel 200 while the flapper valve 234 remains dislodged from its sealed state, plus the flow of water 146 through the bypass tube 220, minus any residual water at a bottom of the water column vessel 200 when the flapper valve 234 reseals, as is illustrated in FIG. 7.

FIG. 7 schematically illustrates the water column vessel 200 of FIG. 3 in side cross-sectional view, illustrating the water column vessel 200 in an empty state or nearly empty state and with the flapper valve 234 resetting to a sealed state. As the water empties from the water column vessel 200, the flapper valve 234 is no longer buoyant within the water, and gravity resets the flapper valve 234 to seal against a sealing surface 232. The water level 260 reaches a low state. The water level 262 is a function of the water flows 207 refilling the water column vessel 200 and water refilling the water tank 20 through activation of the mechanical valve 140 of FIG. 3.

Figure 8:
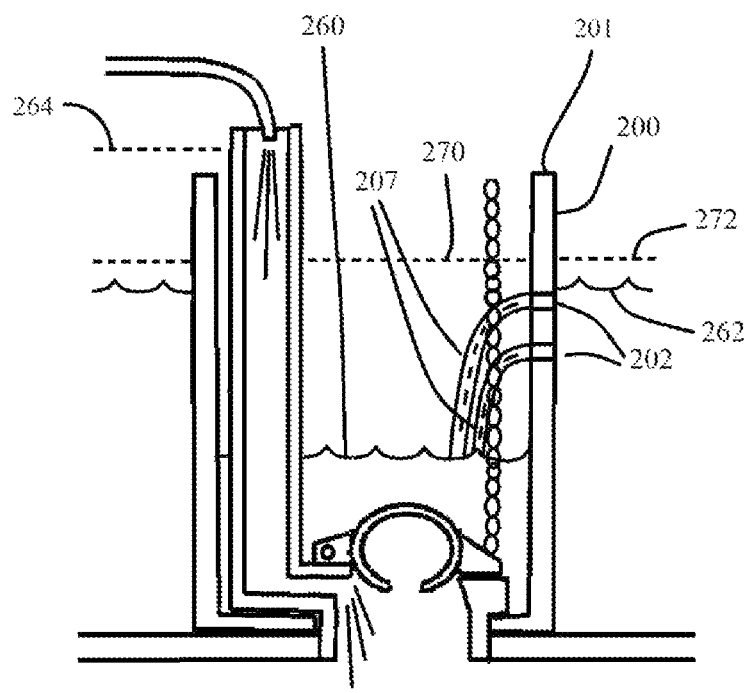

FIG. 8 schematically illustrates the water column vessel 200 of FIG. 3 in side cross-sectional view, illustrating the water column vessel 200 being filled in preparation for a subsequent flush event. The water column vessel 200 including the holes 202 is illustrated. Water flows 207 are illustrated refilling the water column vessel 200, such that the water level 260 is rising. The water level 262 remains a function of the water flows 207 refilling the water column vessel 200 and water refilling the water tank 20 through activation of the mechanical valve 140 of FIG. 3. Eventually, water levels 260 and 262 return to their full levels 270, 272, respectively, and the condition returns to the state illustrated in FIG. 5.

In the embodiment of FIGS. 5-8, the water level 262 is illustrated starting prior to a flush event at a level below an upper edge of the water column vessel 200. In one alternative embodiment, the water level 262 may be filled to a level 264 above the upper edge 201 of the water column vessel 200. In such an embodiment, the length of the bypass tube 220 may be extended to maintain the top of the bypass tube 220 above the water level 264 at its highest point. In this embodiment, the volume of the water tank 20 above the upper edge 201 of the water column vessel 200 empties in an initial portion of the flush event. While this volume of water in the tank above the upper edge 201 of the water column vessel 200 is emptying, the head pressure at the tank outlet valve, corresponding to a depth of water above the tank outlet valve, remains relatively high, therefore maintaining high flushing power through a significant portion of the flush event. In such an embodiment, wherein the water level 264 is configured for being above the upper edge 201 of the water column vessel 200, the holes 202 in the walls of the water column vessel 200 may be omitted, with water flowing over the walls of the water column vessel 200 to fill the water column vessel 200.

In some embodiments, the tank outlet valve may be adjustable or configured for adjustable closure. For example, the flapper valve 234 may be configured to seal with the sealing surface 232 prior to the water column vessel 200 being entirely empty. For example, some flapper valves 234 are adjustable, with a buoyancy of the flapper valve 234 being a variable value. In such an instance, the flapper valve 234 may seal when a quarter or half of the water remains in the water column vessel 200. Similar adjustability may be provided with other types of tank outlet valves.

In combination, an embodiment of the disclosed system including a water level 262 configured to reach a highest level above an upper edge of the water column vessel 200 and an adjustable flapper valve 234 provides a system that 1) may include a calibrated, limited flush volume and 2) may maintain a desirably large head pressure at the tank outlet valve throughout the flush event, thereby providing excellent flushing power with a limited flush volume.

FIG. 9 schematically illustrates a first embodiment of the water column vessel of FIG. 3, wherein the walls 204 of the water column vessel 200 sealingly attach to features of the tank outlet valve 230. The base portion 206 may rest against, clip into, or otherwise seal to the features of the tank outlet valve 230 and/or the walls of the water tank 20.

FIG. 10 schematically illustrates a second embodiment of the water column vessel 300 of FIG. 3, wherein the walls 304 of the water column vessel 300 are affixed to a wall of the water tank 20 with adhesive 309 or a similar material.

Figure 11:
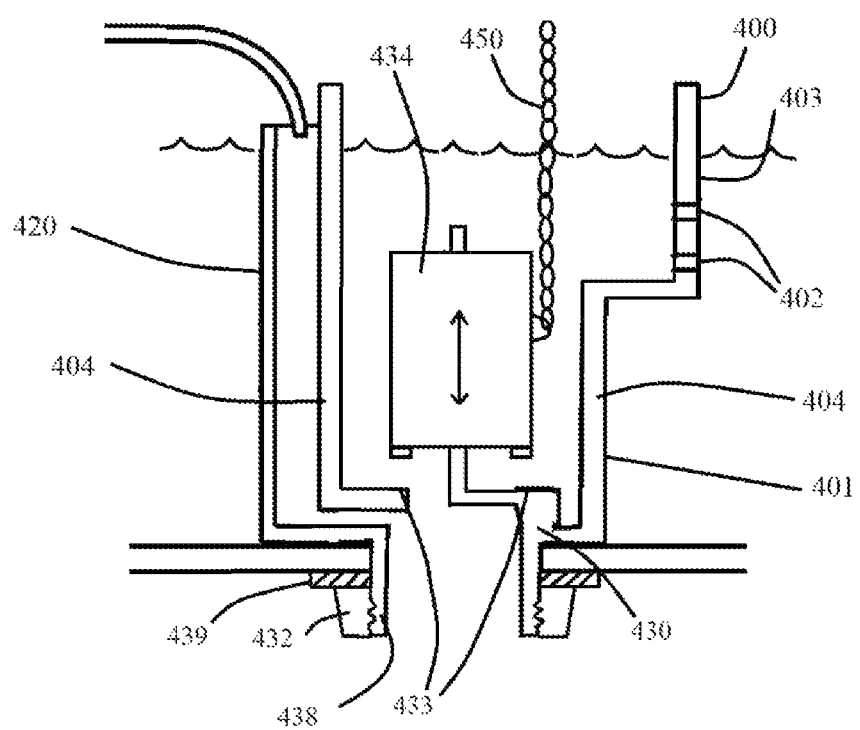
FIG. 11 schematically illustrates in front sectional view an alternative embodiment of a water column vessel, wherein a top portion of the water column vessel is broader than a bottom portion of the water column vessel, in accordance with the present disclosure.

FIG. 11 schematically illustrates an alternative embodiment of a water column vessel 400, wherein a top portion 403 of the water column vessel 400 is broader than a bottom portion 401 of the water column vessel 400, thereby providing excellent head pressure through a greater period of the flush event as compared with other embodiments. The water column vessel 400 is illustrated including an integrated bypass tube 420 which is formed on an outside of the water column vessel 400. A canister valve 434 is illustrated within the water column vessel 400 in place of the flapper valve 234 illustrated in FIG. 3. A flush chain 450 is illustrated attached to the canister valve 434. Holes 402 are formed in walls 404 of the water column vessel 400. The water column vessel 400 is additionally formed unitarily with a tank outlet valve 430 which includes a scaling surface 433 configured to enable the canister valve 434 to seal in a down position. A threaded ring 432 is illustrated attached to a threaded portion 438 and affixing the water column vessel 400 in place, with a sealing washer 439 disposed between the threaded ring 432 and the tank wall to prevent water leaks. The top portion 403 being wider than the bottom portion 401 results in a depth of the water within the water column vessel 400 being greater for a longer period through a flush event. For example, when, during a flush event, half of the water is removed from the water column vessel 200 of FIG. 3, the water level will be approximately halfway between a full level and an empty level. However, in the water column vessel 400 of FIG. 11, as half of the water within the water column vessel 400 is emptied, the water level will be higher than halfway between the full level and the empty level, as the increased volume of the wider top portion 403 keeps the water level higher. Therefore, head pressure at the water tank outlet, which is a function of the depth of the water at that point, remains higher throughout the flush event. The water column vessel 400 is exemplary, and a number of water column vessel 400 geometries are envisioned which result in an increased volume of water being stored in a top portion 403 of the water column vessel 400 in order to maintain higher head pressure throughout a flush event.

Figure 12:
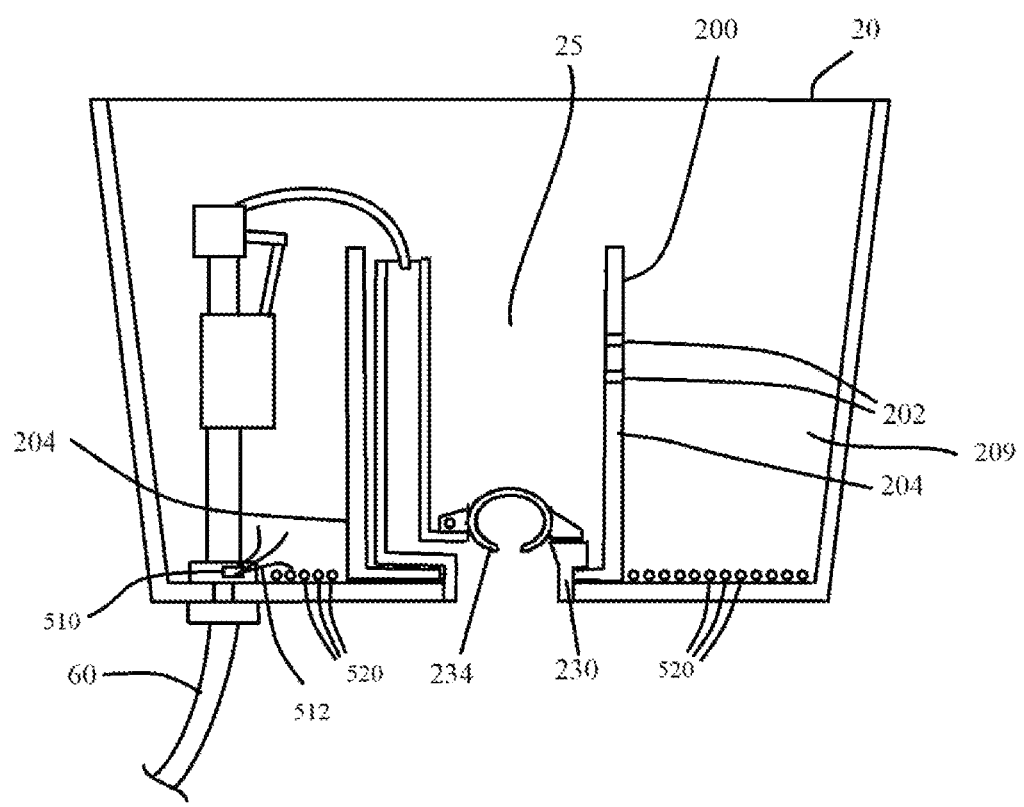
FIG. 12 schematically illustrates the water tank of FIG. 3, wherein a flow of water entering the water tank includes particulate matter/debris, in accordance with the present disclosure.

FIG. 12 schematically illustrates the water tank 20 of FIG. 3, wherein a flow of water 512 entering the water tank 20 includes particulate matter/debris 520. The water tank 20 is illustrated including an intake water orifice 510 configured for providing the flow of water 512 into the water tank 20 from the supply line 60. When the mechanical valve 140 of FIG. 3 is activated by the water level being low, the flow of water 512 is initiated to refill the water tank 20. In some areas, water provided to the water tank 20 may not be entirely pure, for example, including mineral deposits within the water. The flapper valve 234 is illustrated seated against a surface of the tank outlet valve 230. When the seal created between the flapper valve 234 and the outlet valve 230 is tight, water is retained within the tank and the water does not leak past the outlet valve 230. However, particulate matter/debris 520, in the absence of the walls 204 of the water column vessel 200, may accumulate in a bottom of the water tank 20 and contaminate surfaces of the outlet valve 230 and the flapper valve 234. This contamination of the surfaces of the outlet valve 230 and the flapper valve 234 may cause leaks to occur, causing water to be wasted through the toilet fixture. The water column vessel 200 segments the water within the water tank 20 and permits water to enter the water column 25 through the holes 202. The water column vessel 200 may prevent or slow contamination of the outlet valve 230 and the flapper valve 234, causing most or all of the particulate matter/debris 520 to remain outside of the water column 25 and in the water outside of the water column 209.

Figure 13:
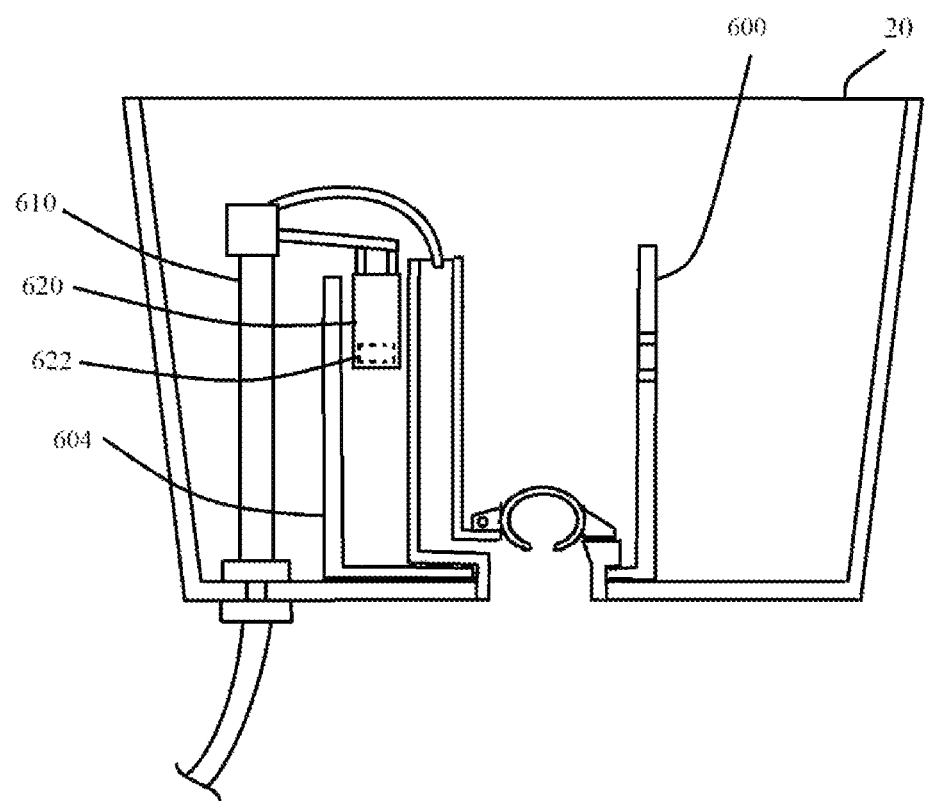
FIG. 13 schematically illustrates the water tank of FIG. 3 with a modified mechanical valve and water column vessel, such that a float mechanism of the mechanical valve is disposed within the water column vessel, in accordance with the present disclosure.

FIG. 13 schematically illustrates the water tank 20 of FIG. 3 with a modified mechanical valve 610 and water column vessel 600, such that a float mechanism 620 of the mechanical valve 610 is disposed within the water column vessel 600. The water column vessel 600 includes a wall 604 shaped to accept the float mechanism 620 within the water column vessel 600. This configuration enables the mechanical valve 610 to activate or deactivate a flow of water into the water tank 20 based upon a water level within the water column vessel 600. The float mechanism 620 is illustrated including an optional weight 622 disposed there within to assist in maintaining a desired orientation of the float mechanism 620.

Figure 14:
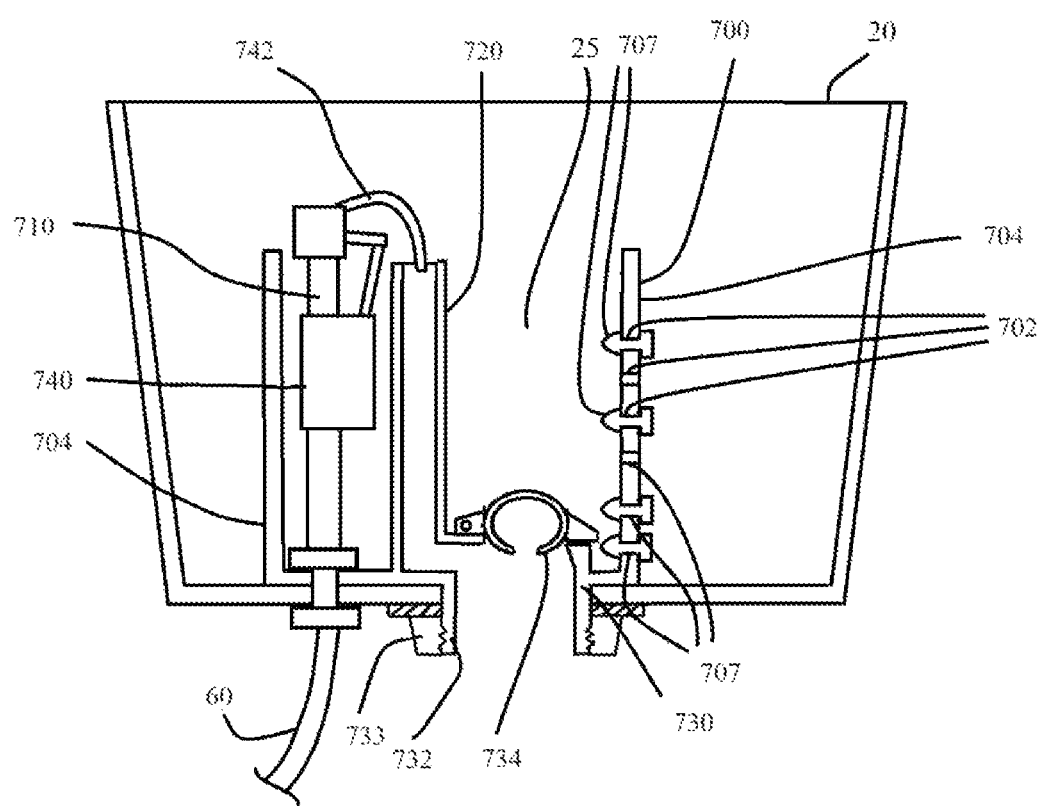
FIG. 14 schematically illustrates in front view the water tank of FIG. 3 with an alternative water column vessel configured for including a mechanical valve and float mechanism therewithin, in accordance with the present disclosure.

FIG. 14 schematically illustrates in a front view the water tank 20 of FIG. 3 with an alternative water column vessel 700 including a mechanical valve 710 including a float mechanism 740, both disposed within the water column vessel 700. The water column vessel 700 may be formed unitarily or in one piece with an integrated bypass tube 720 and a tank outlet valve 730. A water tube 742 is illustrated providing water from the mechanical valve 710 to the bypass tube 720 in order to fill the bowl of the toilet after a flush event. The tank outlet valve 730 is controlled by activation of a flapper valve 734 and includes a threaded ring 733 attached to a threaded portion 732 and affixing the water column vessel 700 in place. The water column vessel 700 is illustrated including a wall portion 704 surrounding the water column 25, wherein at least one hole 702 is formed in the wall portion 704. Of the plurality of illustrated holes 702, four are plugged with stoppers 707. The stoppers 707 may include a variety of structures useful to manually or selectively plug a portion of the holes 702. In the embodiment of FIG. 14, the stoppers 707 may be polymerized, flexible plugs that may be pressed into and pulled out of the holes 702 by a consumer or an installer. Behavior, time to fill, and other characteristics of the toilet including the water column vessel 700 may be affected by which holes 702 and how many holes 702 are selectively plugged. Holes 702 near a bottom of the wall 704 may pass water more quickly than similarly sized holes 702 near a top of the wall 704, as head pressure of the water within the tank 20 or the water column 25 is greater at greater water depth. In order to compensate for this difference in flow rate through the holes 702, holes 702 near a top of the wall 704 may include a larger diameter or width than holes 702 near a bottom of the wall 704. Also, during a flush event, as the water level within the tank 20 goes down, water may cease to flow through holes 702 near a top of the wall 704, as the water level may drop below the holes 702, whereas holes 702 near a bottom of the wall 704 will rarely be above the water level. A time for water to fill the tank 20 and the water column 25 may be affected and controlled by which holes 702 and how many holes 702 are plugged or open. By providing stoppers 707 which may be manually set or adjusted, the user may have control over operation of the toilet.

In the embodiment of FIG. 14, the mechanical valve 710 and the float mechanism 740 are illustrated within the water column 25, surrounded by the walls 704. As a result, after a flush event is initiated, the water level of the water column 25 goes down, and the float mechanism 740, no longer being buoyed in an up position, may drop and cause the mechanical valve 710 to permit water to flow from the supply line 60 into the water column 25. As the flush event progresses, water flows in through the mechanical valve 710, slowing a drop of the water level of the water column 25, and may extend a length of the flush event as compared to a flush wherein only the water within the water column 25 is used to flush the toilet. Water similarly flows in through any of the plurality of holes 702 which are not plugged by the stoppers 707 from the tank 20 outside of the water column 25. As the flush event completes and the flapper valve 734 reseals against the tank outlet valve 730, water flowing in through the supply line 60 and water flowing in through the holes 702 not plugged by the stoppers 707 fills the water column 25. As a water level of the water column 25 exceeds a water level of water in the tank 20 outside of the walls 704, water flows outwardly through the holes 702 from the water column 25 to the area outside of the walls 704.

Figure 15:
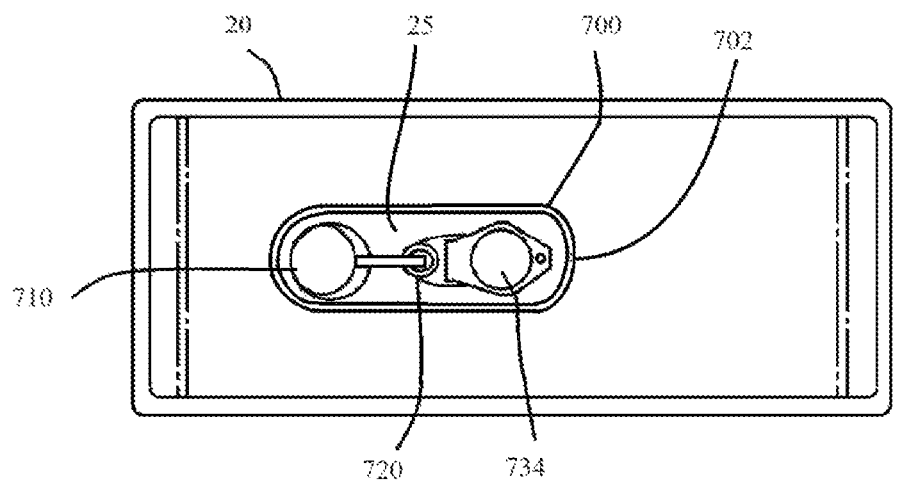
FIG. 15 schematically illustrates in top view the water tank and water column vessel of FIG. 14, in accordance with the present disclosure.

FIG. 15 schematically illustrates the water tank 20 and the water column vessel 700 of FIG. 14 in a top view. The tank 20 is illustrated including the water column vessel 700 including one or more holes 702 formed in a wall of the water column vessel 700. The mechanical valve 710, the bypass tube 720, and the flapper valve 734 are illustrated within the water column vessel 700. Water entering the water column vessel 700 through the mechanical valve 710 first begins to fill the water column 25, and as the water level of the water column 25 increases, water may then flow through the holes 702 to fill the area of the tank 20 outside of the water column vessel 700.

Figure 16:
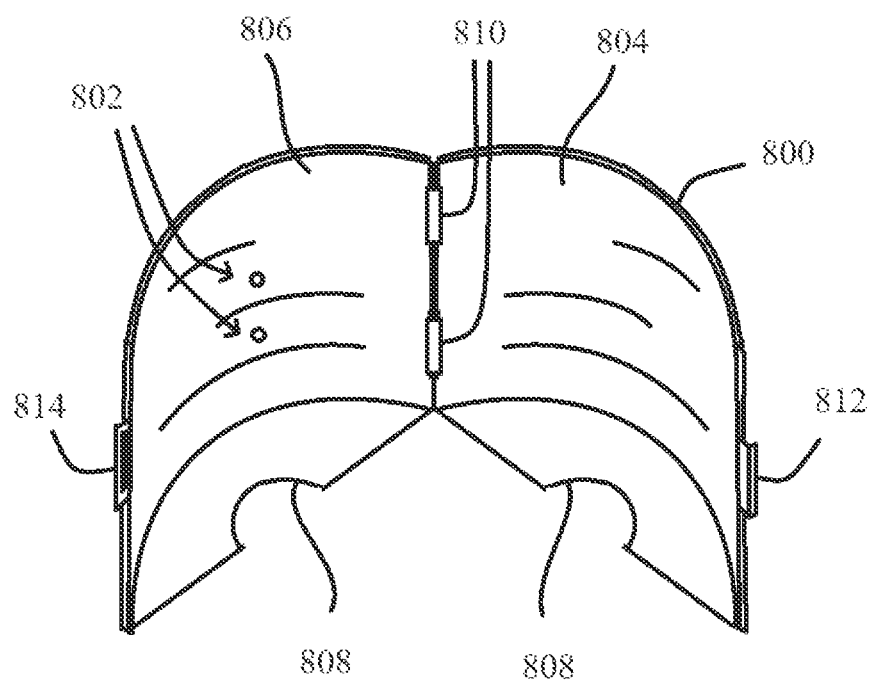
FIG. 16 schematically illustrates in perspective view an alternative water column vessel including a pair of housings joined with at least one hinge in preparation for being installed to a water tank, in accordance with the present disclosure.

FIG. 16 schematically illustrates an exemplary alternative embodiment of a water column vessel 800 including a pair of hinged housings 804, 806 useful for installation within a water tank. The housings 804, 806 are attached with at least one hinge 810, which permit the housings 804, 806 to rotate relative to each other between an open state, as illustrated, and a closed state wherein the housings 804, 806 may be secured around a tank outlet valve. Each of the housings 804, 806 may include a cut-out portion 808 configured to secure against or around a tank outlet valve. In one embodiment, multiple versions of the water column vessel 800 may be manufactured and marketed for use with specific brands of toilets or manufacturers of tank outlet valves, such that the cut-out portions 808 may specifically match the geometry of the respective tank outlet valve. A plurality of holes 802 are illustrated in side walls of the housings 804, 806, enabling water to flow therethrough, as disclosed herein. Locking housing features 812, 814 are optionally provided for a purpose of securing the housings 804, 806 in the closed state.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A high efficiency toilet configuration, the toilet configuration comprising:
 a water tank including:
  a water supply line;
  a mechanical valve controlling a flow of water from the water supply line into the water tank;
  side walls and a tank base defining an internal volume of the water tank;
  a first through-hole in the tank base configured for channeling water out of the water tank;
  a tank outlet hole including a housing extending through the first through-hole in the tank base;
  a tank outlet valve configured for selectively prohibiting water in the water tank from flowing through the tank outlet hole and permitting water to flow through the tank outlet hole during a flush event; and
  a water column vessel disposed around the tank outlet hole and configured for separating water in the water tank between water outside of the water column vessel and a channel of water contained over the tank outlet hole; and
 a toilet base including:
  a bowl including a waste receiving basin; and
  a water supply plenum operable to receive water from the water tank and channel the water to the bowl;
 wherein the water column vessel is relatively wider at a top portion and relatively narrower at a bottom portion.

2. The high efficiency toilet configuration of claim 1, wherein the tank outlet valve includes a polymerized flapper valve and a weight attached to the polymerized flapper valve.

3. A high efficiency toilet configuration, the toilet configuration comprising:
 a water tank including:
  a water supply line;
  a mechanical valve controlling a flow of water from the water supply line into the water tank;
  side walls and a tank base defining an internal volume of the water tank;
  a first through-hole in the tank base configured for channeling water out of the water tank;
  a tank outlet hole including a housing extending through the first through-hole in the tank base;
  a tank outlet valve configured for selectively prohibiting water in the water tank from flowing through the tank outlet hole and permitting water to flow through the tank outlet hole during a flush event; and
  a water column vessel disposed around the tank outlet hole and configured for separating water in the water tank between water outside of the water column vessel and a channel of water contained over the tank outlet hole; and
 a toilet base including:
  a bowl including a waste receiving basin; and
  a water supply plenum operable to receive water from the water tank and channel the water to the bowl;
 wherein the mechanical valve includes a float mechanism controlling activation and deactivation of the mechanical valve; and
 wherein the float mechanism is disposed within the water column vessel.

4. The high efficiency toilet configuration of claim 3, wherein the water column vessel includes a second through-hole configured for permitting the water outside of the water column vessel to refill the channel of water.

5. The high efficiency toilet configuration of claim 3, wherein walls of the water column vessel are formed unitarily with walls of the water tank.

6. The high efficiency toilet configuration of claim 3, wherein the water column vessel is a separate component which attaches to one of the tank outlet valve or walls of the water tank.

7. The high efficiency toilet configuration of claim 3, wherein a base portion of the water column vessel secures against features of the tank outlet valve.

8. The high efficiency toilet configuration of claim 3, wherein walls of the water column vessel are affixed to walls of the water tank.

9. The high efficiency toilet configuration of claim 3, wherein the water tank further includes a bypass tube configured for enabling water to refill the waste receiving basin after the flush event; and
 wherein the bypass tube is contained within the water column vessel.

10. The high efficiency toilet configuration of claim 3, wherein the water tank further includes a bypass tube configured for enabling water to refill the waste receiving basin after the flush event; and
 wherein the bypass tube is formed unitarily with the water column vessel.

11. The high efficiency toilet configuration of claim 10, wherein the tank outlet valve is formed unitarily with the water column vessel.

12. The high efficiency toilet configuration of claim 3, wherein the water column vessel is configured for segmenting water within the water column vessel from water outside of the water column vessel, such that particulate matter or debris within the water outside of the water column vessel is prevented from contaminating the tank outlet valve.

13. The high efficiency toilet configuration of claim 3, wherein the tank outlet valve includes a flapper valve.

14. The high efficiency toilet configuration of claim 3, wherein the water tank is configured for a water level prior to the flush event being higher than an upper edge of the water column vessel.

15. The high efficiency toilet configuration of claim 14, wherein the tank outlet valve is configured for adjustable closure.

16. The high efficiency toilet configuration of claim 3, wherein the tank outlet valve is configured for adjustable closure.

17. A high efficiency toilet configuration, the toilet configuration comprising:
    a water tank including:
        a water supply line;
        a mechanical valve controlling a flow of water from the water supply line into the water tank;
        side walls and a tank base defining an internal volume of the water tank;
        a first through-hole in the tank base configured for channeling water out of the water tank;
        a tank outlet hole including a housing extending through the first through-hole in the tank base;
        a tank outlet valve configured for selectively prohibiting water in the water tank from flowing through the tank outlet hole and permitting water to flow through the tank outlet hole during a flush event; and
        a water column vessel disposed around the tank outlet hole and configured for separating water in the water tank between water outside of the water column vessel and a channel of water contained over the tank outlet hole; and
    a toilet base including:
        a bowl including a waste receiving basin; and
        a water supply plenum operable to receive water from the water tank and channel the water to the bowl;
    wherein the tank outlet valve includes a polymerized flapper valve and a weight attached to the polymerized flapper valve.

18. The high efficiency toilet configuration of claim 17, wherein the water column vessel is relatively wider at a top portion and relatively narrower at a bottom portion.

* * * * *